May 16, 1950 K. W. WENNERSTROM 2,508,129
PHOTOGRAPHIC EXPOSURE DETERMINING DEVICE
Filed Feb. 15, 1949 2 Sheets-Sheet 1

INVENTOR
*KNUT W. WENNERSTROM*
BY *Fisher + Christen,*
ATTORNEYS

May 16, 1950     K. W. WENNERSTROM     2,508,129
PHOTOGRAPHIC EXPOSURE DETERMINING DEVICE

Filed Feb. 15, 1949                         2 Sheets-Sheet 2

INVENTOR

KNUT W. WENNERSTROM

BY Fisher + Christen,
ATTORNEYS

Patented May 16, 1950

2,508,129

UNITED STATES PATENT OFFICE 2,508,129

PHOTOGRAPHIC EXPOSURE DETERMINING DEVICE

Knut W. Wennerstrom, Dayton, Ohio

Application February 15, 1949, Serial No. 76,550

8 Claims. (Cl. 235—64.7)

This invention relates to a photographic exposure determining device, and more particularly, to a device which gives the photographer a visual indication of the exact tone or density which will result in the finished positive print by the use of a particular exposure. By "particular exposure" is meant a given aperture opening and exposure time, or any set of different aperture openings and exposure times which would result in the same amount of light reaching the film when the picture is taken.

Most photographers are familiar with the usual types of scales which are available for use, with or without the assistance of light measuring devices, in determining the correct exposure for a given scene. In most of these devices, once a light brightness value is determined, a datum marking on a dial is moved to a position adjacent the light value found, resulting in the alignment of a series of f opening values and a series of exposure times. The desired exposure can then be selected from any of a group of alternative combinations of f opening and exposure time.

In arrangements of the type just described, the location of the datum marking on the dial is a mere approximation of average operating conditions for the average type of scene, and in many cases the particular position of this marking is at variance with the practices of the photographer. That is, because of the particular habits and type of equipment and developing facilities and techniques used by the photographer, use of the meter in strict conformity with the manufacturer's directions results in pictures which vary in tone or density from that of the scene photographed, and/or from the particular tone or density desired by the photographer. This variance can be corrected either by a change in the techniques practiced by the photographer in the darkroom or by the making of a mental correction in the indication given by the meter so as to compensate for the inaccuracies or variances known to result from strict use of the meter in accordance with the manufacturer's recommendations.

In one type of meter now in common use, the marking referred to above is accompanied by two other markings, one on each side of the normal marking. These other markings indicate, respectively, one-half and double exposure, and one or the other of these extra markings may be lined up with the light value reading when it is desired to halve or double the exposure. However, even by the use of these extra markings, the photographer is still working mainly by guess, and he has no accurate way of determining, at the time he takes the picture, whether or not his finished positive print will correspond in the manner which he desires, to the scene photographed.

The present invention overcomes all of the disadvantages pointed out above by providing a graduated set of positive areas of graduated density from black to white, for direct comparison with the scene being photographed, and in a preferred embodiment of the invention, this scale of densities is mounted on the dial of the exposure determining device in such a manner that the photographer, at the time he is ready to take a picture, can select the tone or density area matching the desired tonal density of the finished print, and the selected density area can then be aligned with the light value reading, instead of aligning a mere arbitrary marking as in the general practice described above. The photographer may match one of the areas of the density scale with a particular portion of the scene being photographed so as to reproduce that particular portion of the scene most faithfully, or he may purposely select a different shade, knowing that the final print will then have the tone and density of the selected density scale area, rather than the exact tone and density of the scene photographed. The use of the invention is of course based on the assumption that the photographer using the device has a standardized darkroom technique so that no unwanted variations will be introduced during the developing or printing operations.

The device which I have invented may also include a color range section, separately calibrated for use when taking photographs in color. While I have found that best results are obtained by using nine variations of density between black and white for use in black and white photographs, it is usually preferable to limit the range of shades in the color photography section to the five or six shades falling about and on the light side of the central portion of the density range used for black and white photography. This results from the fact that the latitude of color film is considerably smaller or narrower than that of black and white film, and also from the fact that subjects falling within the darker end of the black and white range will have too low a reflectance to hold up in color when final color prints are made. The color range section permits the photographer to make sure that his exposure is correct for the particular color in the scene which is to be reproduced most accurately in the final print.

An object of my invention is to provide an exposure determining device by the use of which a photographer can compare a graduated range of tonal densities with the scene being photographed, and by selecting a particular tonal value which he wishes to reproduce in the finished positive print, can utilize this density value in selecting the f opening and exposure time which he will use in taking the picture.

Another object of the invention is to provide a device for attachment to the dial of a photographic exposure determining device, and by means of which, a tonal density corresponding to the density of the finished positive print can be compared with the scene being photographed, and can be used in selecting the dial setting of the indicating device.

Another object of the invention is the provision on a photographic exposure determining device of a tonal density scale graduated between black and white, so that this scale can be compared directly with the scene being photographed, and the desired tonal density can be aligned with the light brightness indication of the scene, thereby lining up the various f opening numbers with the corresponding correct exposure times on the device.

A further object of the invention is the provision of a device as described in the preceding object, and which includes density indications particularly designated for comparison with a scene being photographed in color.

Still another object of the invention is to provide a device as described in the various preceding objects of the invention, and which can be readily attached to and adjusted on the dials of various types of exposure devices.

These and other objects of the invention will become more apparent from a study of the following specification, taken in conjunction with the accompanying drawings, in which.

Figure 1:
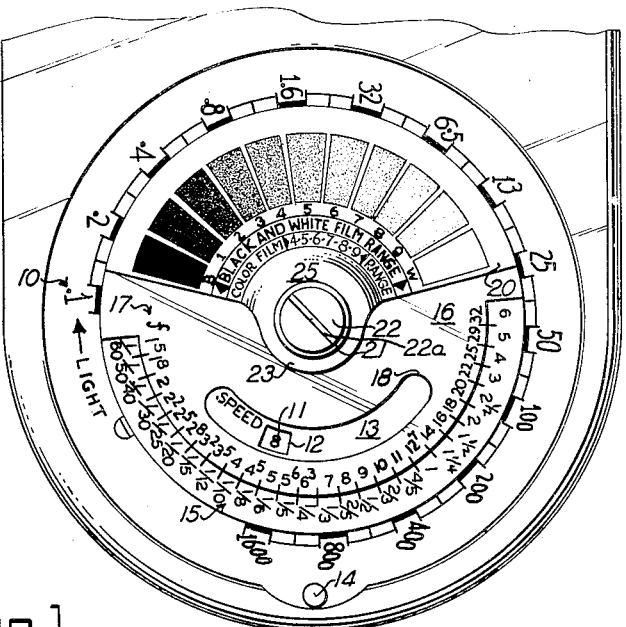
Fig. 1 is a face view showing one form of the invention in use on an exposure determining device.

Referring now to the drawing in more detail, Fig. 1 shows what is, for the most part, a conventional exposure determining device as used with the popular Weston Universal exposure meter Model 715. This device has a stationary outer scale 10 bearing a plurality of light brightness indicating numbers, the larger numbers indicating increasing light brightness. Spaced inwardly from the set of light indications 10, is a stationary set of numbers 11 which correspond to the emulsion speeds of various types of films. The film speeds 11 may be viewed through a window 12 in a movable dial plate 13 which is mounted above the stationary base which carries the light indications 10 and the film speed values 11. The dial 13 may be locked in a plurality of positions selected in accordance with the particular film used, by means of a spring device 14. The flat dial 13 carries about its peripheral portion a series of exposure time values shown at 15. Still another flat dial 16 is mounted on top of the dial 13, and coaxially therewith. The dial 16 has two semi-circular positions having different radii. The portion of smaller radius has a plurality of f opening numbers 17 printed or otherwise placed thereon, so as to be moveable in close proximity to the exposure time values 15 carried on the dial 13. The dial 16 has an arcuate window 18 to permit viewing of the film speed values 11.

Dial plate 16, which is moveable freely with respect to the other portions of the device, ordinarily carries at some point along the edge of its portion of larger radius, a marking usually in the form of an arrow (not shown), which, when moved to a position adjacent any one of the light indication values 10, so positions the dial plate 16 that the various f opening numbers 17 are positioned adjacent the corresponding exposure time values 15 for that particular light brightness. However, according to the present invention, a fan shaped tonal scale 20 is mounted on the dial 16 on the portion of greater radius so as to cover up or replace the conventional arrow or other marking which would ordinarily be found thereon.

The tonal scale shown in Fig. 1 is shown in greater detail in the other figures of the drawing, and particularly in Fig. 2, and since the scale shown in Figs. 2 and 3 differs from that of Fig. 1 only in the manner of attachment to the dial plate 16, the scale will be described in greater detail in connection with the figures showing greater detail. As shown in Fig. 1, the scale 20 is attached to the dial plate 16 by means of a washer or retainer 21 held in place by a screw or bolt 22 which passes through the center and pivot 23 of the dial arrangement. The scale 20 in this embodiment is also secured to the dial plate 16 by means of adhesive but in view of the disclosure below, the invention is not to be limited to this manner of attachment.

Figure 3:
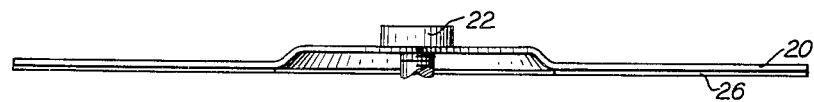
Fig. 3 is an edge-on view of the device shown in Fig. 2.
Figure 2:
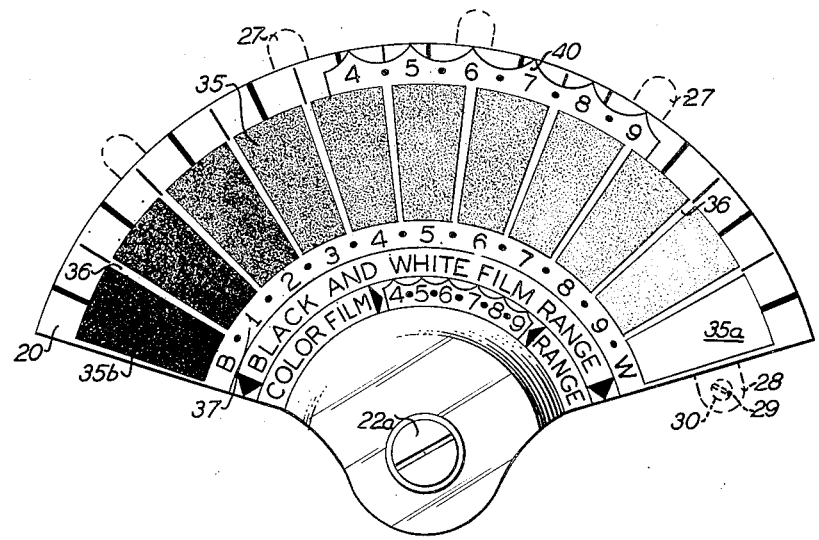
Fig. 2 is a face view of the scale shown in Fig. 1 and in a form which can readily attached to and detached from the dials of an exposure determining device.

Referring now to Figs. 2 and 3, the fan shaped scale 20 has a central mounting portion 25 by which it is attached to the meter by screw 22a. The bolt 22a is threaded into an opening (not shown) as explained in connection with Fig. 1, and once the correct position of the scale 20 is determined, it may be promptly attached to the dial 16 by means of adhesive, or it may be caused to revolve with plate 16 by means of a frictional material 26 carried on the undersurface of the scale as shown at 26 in Fig. 3.

Figs. 2 and 3 also show in dotted lines other alternate means of attachment of the scale to the plate 16, although it will be readily understood that various additional types of attachment may be used without departing from the inventive concept. As shown in dotted lines on Figs. 2 and 3, spring clips 27 may be positioned about the periphery of the scale at spaced points so as to clip under the outer edge of plate 16. In another variation, tabs 28 may be provided on the radially extending marginal portions of the scale, and by means of small screws 29 passing through slots 30 in these tabs for engagement with threaded openings (not shown) in plate 16, the scale 20 may be mounted in various rotational positions on the plate 16 so as to suit the individual user's needs.

Most of the face area of the scale 20 is taken up with a plurality of areas 35 of graded density running from white at 35a to black at 35b, and separated by thin lines 36. I have found it convenient to provide nine intermediate density areas, but my invention is not to be considered as limited to the use of this particular number, since other numbers of areas may be used if preferred. The various areas 35 are designated, for convenience, by a series of numbers 37 beginning with the areas next to the black area 35b.

For use when taking photographs in color, the scale 20 has a portion of the areas of varying densities 35 coordinated with a set of numbers shown at 40 in Fig. 2, these numbers being placed adjacent certain of the areas 35 near the central portion and on the bright side of the scale 35. The numbers of the color scale as shown at 40 are grouped together more closely than the numbers 37 designating the areas 35 of the black and white scale. The smaller latitude of color films is the reason for the arranging of the number 40 for color work in the manner illustrated.

The device is used in the following manner:

The light brightness of the scene or subject to be photographed is determined. The photographer then appraises the scene itself, or the image on the ground glass, whichever he prefers, he then selects a bracket of about four or five shades 35 which seem approximately to match the "Major Area" of the scene. He then places the center of that bracket of shades at the exact spot or number on the light value scale 10 indicated when the reading was taken, thereby automatically placing those shades or values in the scene, in their proper position in regards to the density range of the film, in other words the film latitude. The proper speed for each f stop can now be obtained from the shutter speed scale 13. The thin lines 36 located half between each shade area 35 on the device are to be used when the center of a bracket falls between two shades 35, and also when individual readings are taken of a subject, whose value appears to fall between two shades of the device.

On indoor setups, where the photographer has control of the lighting, he may take individual readings of the subjects to be photographed, first taking a reading of the most important subject, then selecting the shade 35 on the device which appears to match, setting that shade at the correct value on the light value scale when the reading was taken, then by leaving this shade in position, he may proceed to check other subjects in the scene by taking individual readings of each one. By watching the results of each reading, he can in each operation, check with the shades on the device, and see approximately how each subject will look in the final print. If any change in lighting seems necessary, the photographer can move his lights, and then by rechecking with the device, see just what results each alteration in his lights produced. All of this can be done before the exposure is made, thus eliminating any disappointing results in the final print. On outdoor close-ups where the photographer has no control of the light source, he may at times, when unusual or special affects are desired, deliberately select a shade or two, or even more to the dark or light side of the shade which matches the subject. The device will in each case adjust the exposure time to give the right density in the negative to reproduce the shade selected, when the final print is made.

Since the position of scale 20 is adjustable on the exposure guide dial by the means described above, the photographer can adjust the scale 20 by rotation to the left or the dark end relative to plate 16 should conditions such as shutter speed variances, types of developer, etc., cause negatives constantly to come up underexposed or too thin. Since the shades progress from left to right, each shade to the right or light end represents a measured increase in negative density, so the scale 20 should be rotated about its center to the left, thereby bringing the next lighter shade into the position previously occupied by the area to its left, or shifting two shades to the left if necessary, until the desired results are obtained. If consistent overexposure occurs, the process is reversed by shifting to the right, as each dark value brought into position represents a measured decrease in negative density. If the photographer uses several types of developers, the device is best left in normal position, making adjustments by simply moving the whole exposure guide dial one or more shades to the left or right, depending on what type of developer is going to be used. The photographer should, after making a few experimental tests, be able to decide the final position of the scale 20 on the exposure guide dial of his meter, to coordinate with his own individual dark room practices. A card with a set of shades corresponding to shades on the scale 20 may be used by the amateur until he acquires proficiency in comparing the shades on the scale 35 with the actual subjects of which he is taking light readings, after which he will rely entirely on the scale 35 mounted on the meter. It should be remembered that the accuracy of the device in determining final print results is dependent on the time and temperature of the developer used during the experimental tests, as well as the type of developer used. All these must be kept constant, as changing from one developer to another can produce more or less density in the negative even though the time and temperature is the same, and thereby making it necessary to do some manipulating when the final prints are made.

It should now be apparent that I have invented a simple yet highly efficient device which facilitates the selection, for every picture, of a set of exposure conditions which will give the exact tonal density desired in the finished picture. My invention is susceptible of so many various embodiments without departing from the inventive concept that it would needlessly increase the length of this specification to attempt to enumerate all such variations. However, it should be understood that the scale of gradations can be continuous and can be used in accordance with my invention, either with an exposure indicating device mounted on a light meter, or it can be used with such a device separate from the meter, it being important only that the exposure indicating device be of the type in which ordinarily a marking is matched with, that is, moved to a position adjacent an indication of the brightness of the light. By using a graduated scale of densities in place of the ordinary marking in such a device, my invention in practice achieves the aforesaid advantages.

Figure 4:
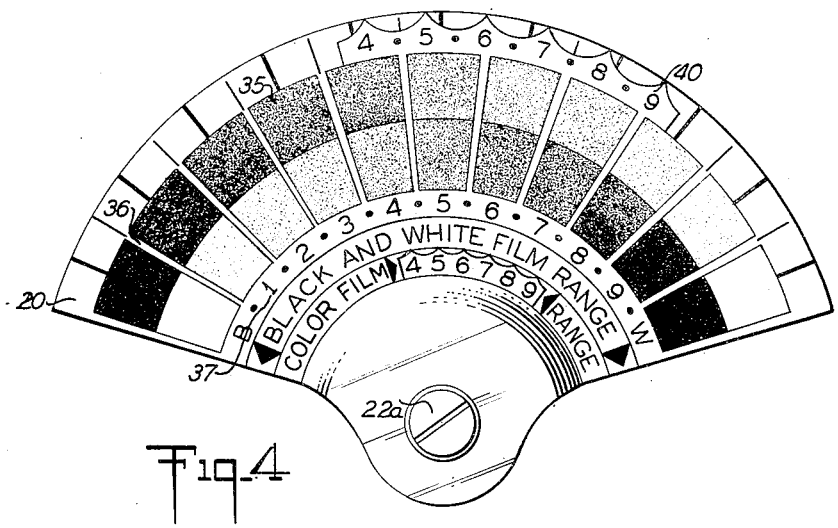
Figure 4 is a face view of a modified form of the scales shown in Figure 2.

Another variation which might be used would be to have two sets of the varying density areas 35 positioned one radially outwardly of the other, and with the densities of the two sets varying in opposite directions, one becoming darker in a counter clockwise direction as in Fig. 2 and indicating tonal density of the finished print, and the other becoming darker in the clockwise direction and indicating tonal density of the negative, as shown in Figure 4.

I also wish to point out that the manner of attachment of scale 20 to the indicating device is not critical as long as the scale can be fixed in at least one position on the structure corresponding to plate 16 on the Weston device described above, it being preferable that the position of the scale can be varied until the best position for each particular user is determined.

I claim:

1. In a photographic exposure determining device of the type in which a datum marking cooperates with a series of light brightness indications to indicate correct exposure conditions, that improvement in which said datum marking comprises a graduated series of tonal density areas for direct comparison with the scene being photographed and selection of an area having a density corresponding most nearly to the density desired in the positive print, each of said areas being substantially identical in tonal density with the density which standardized developing conditions will produce in a positive print resulting from an exposure made under exposure conditions selected by aligning the area of desired density with the light brightness indication given by the scene.

2. An arrangement as set forth in claim 1, and indicia means for distinguishing certain of said areas for photography in color.

3. An arrangement as set forth in claim 1, a flat element carrying said areas and adapted for convenient attachement to conventional type exposure determining devices, and means for attaching said element.

4. An arrangement as set forth in claim 1, a flat element carrying said areas and adapted for convenient attachment to conventional types of exposure determining devices, and means for attaching said element, said attaching means including means for adjustably positioning said element to permit selection of a permanent position best suited to varying photographic techniques.

5. An arrangement as set forth in claim 1, a flat element carrying said areas, and spring clips on said element for mounting said element on the device.

6. An arrangement as set forth in claim 1, a flat element carrying said areas, and slotted tabs carried by said element to faciiltate attachment to the device.

7. An arrangement as set forth in claim 1, and a flat, fan-shaped element carrying said areas, a central portion of said element being provided with a mounting opening.

8. In a photographic exposure determining device of the type in which a datum marking cooperates with a series of light brightness indications to indicate correct exposure conditions, that improvement in which said datum marking comprises a graduated series of tonal density areas for direct comparison with the scene being photographed and selection of an area having a density corresponding most nearly to the density of a portion of the scene being photographed, each of said areas being substantially identical in tonal density with the density which standardized developing conditions will produce in a positive print resulting from an exposure made under exposure conditions selected by aligning the area of desired density with an indication bearing a known relation with the light brightness indication given by the scene.

KNUT W. WENNERSTROM.

REFERENCES CITED

The following references are of record in the file of this patent:

UNITED STATES PATENTS

| Number | Name | Date |
| --- | --- | --- |
| 2,322,044 | McFarlane et al. | June 15, 1943 |
| 2,323,676 | Rath | June 6, 1943 |
| 2,380,244 | Jones et al. | July 10, 1945 |
| 2,408,944 | Miller | Oct. 8, 1946 |